United States Patent [19]

Smith

[11] Patent Number: 5,012,689

[45] Date of Patent: May 7, 1991

[54] VEHICLE FOOT PEDAL ACTUATOR APPARATUS AND METHOD

[76] Inventor: Steven R. Smith, 1503 Oak Knoll La., Lockhart, Tex. 78644

[21] Appl. No.: 417,197

[22] Filed: Oct. 4, 1989

[51] Int. Cl.$^5$ .................... F16H 19/04; G05G 1/21
[52] U.S. Cl. ................................ 74/89.17; 74/481; 74/512; 74/532; 200/317; 254/DIG. 5; 254/95; 318/266; 318/466
[58] Field of Search ............... 74/89, 17, 481, 482, 74/512, 513, 532; 73/132; 254/DIG. 5, 95; 318/266, 466; 200/317

[56] References Cited

U.S. PATENT DOCUMENTS

| | | | |
|---|---|---|---|
| 1,907,835 | 5/1933 | Langbein | 73/132 |
| 2,566,859 | 9/1951 | Seeler | 74/532 X |
| 2,649,814 | 8/1953 | Brazell | 254/DIG. 5 X |
| 2,964,965 | 12/1960 | Hanson | 74/481 |
| 3,464,263 | 9/1969 | Omandam, Sr. | 73/132 |
| 3,662,593 | 5/1972 | Pirrello et al. | 73/132 |
| 3,824,847 | 7/1974 | Chambers | 73/132 |
| 3,877,318 | 4/1975 | Castoe | 74/482 X |
| 3,991,609 | 11/1976 | Asmus et al. | 73/132 |
| 4,093,181 | 6/1978 | Ivins | 254/97 |
| 4,186,595 | 2/1980 | Domitter | 73/132 |
| 4,653,727 | 3/1987 | Chang et al. | 254/126 X |
| 4,772,769 | 9/1988 | Shumate | 200/317 X |
| 4,872,230 | 10/1989 | Levine | 254/126 X |

*Primary Examiner*—Allan D. Herrmann
*Attorney, Agent, or Firm*—J. Nevin Shaffer, Jr.; Russell D. Culbertson

[57] ABSTRACT

A vehicle foot pedal actuator device is adapted for both depressing a vehicle foot pedal and returning the pedal to its normal position. The actuator device includes a variable length extension assembly adapted to be connected between the vehicle driver's seat and the pedal to be actuated. A drive arrangement is adapted for extending and retracting the extension assembly, and a control system having a moveable remote control unit is adapted for controlling the operation of the actuator from various positions around the vehicle where maintenance and repair work may be performed. The extension assembly preferably includes an elongated extension housing tube adapted to receive an elongated extension member that may be extended and retracted in a telescoping fashion to vary the length of the assembly. The actuator device also includes a connecting arrangement for connecting the extension assembly between the foot pedal to be actuated and the vehicle driver's seat to enable the extension assembly to exert both a pulling and pushing force to work the vehicle pedal. The preferred connecting arrangement includes a seat belt connecting member adapted to receive a portion of the vehicle driver's seat belt so as to hold one end of the extension assembly securely against the front of the vehicle driver's seat. The opposite end of the extension assembly includes a pedal connector for connecting to a particular pedal to impart both a pushing and pulling force to the pedal. Also, in the preferred form of the invention, the control system includes an indicator for providing an indication of the operational status of the device at the remote control unit. The indicator allows the operator to know at the remote location if the extension member is being extended, retracted, or is stationary with respect to the extension housing.

22 Claims, 5 Drawing Sheets

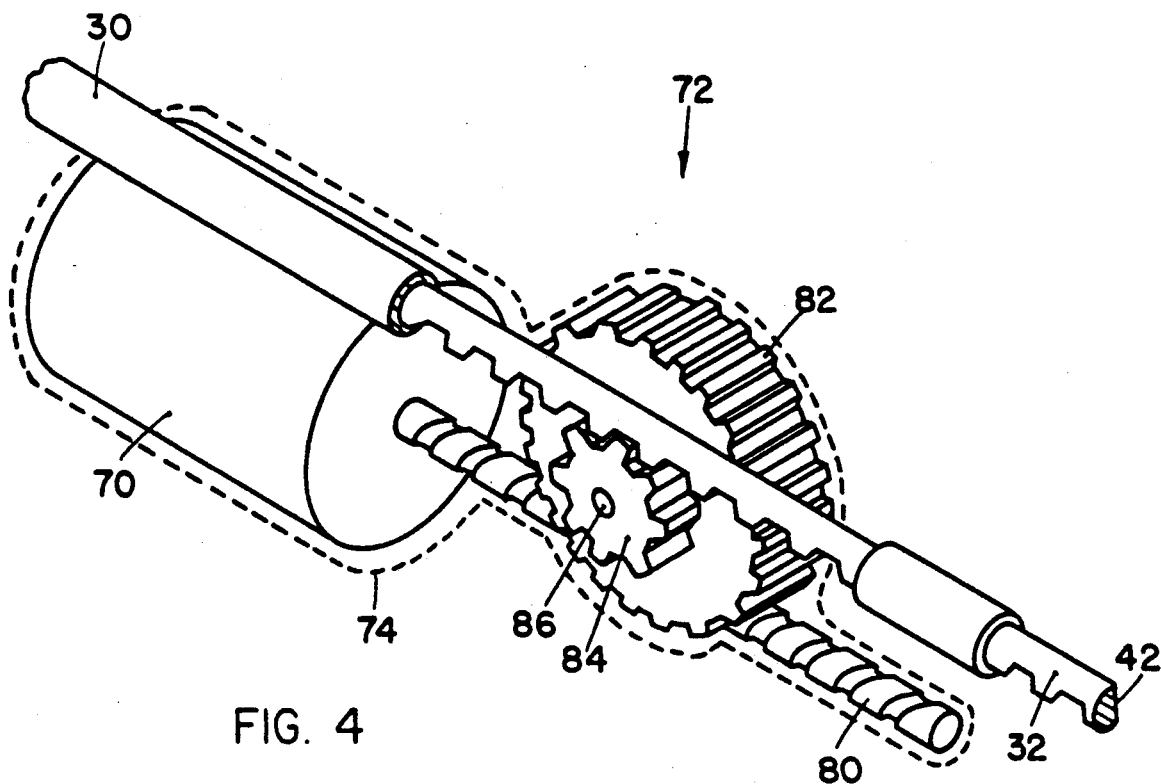
FIG. 4
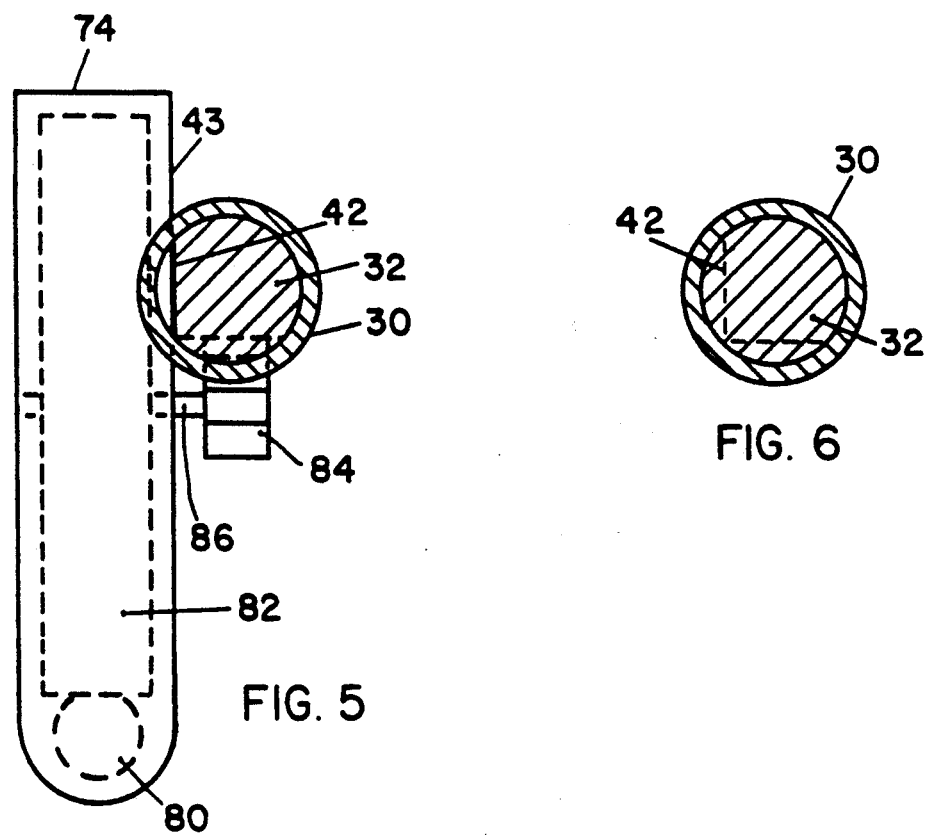
FIG. 5
FIG. 6

VEHICLE FOOT PEDAL ACTUATOR APPARATUS AND METHOD

BACKGROUND OF THE INVENTION

The invention relates to vehicle foot pedal actuators, and particularly to a vehicle foot pedal actuator adapted to be easily and quickly installed in a vehicle for actuating a foot pedal from substantially any position about the vehicle. The invention also encompasses methods for remotely actuating a vehicle foot pedal.

Many vehicle repair or maintenance operations require a mechanic or technician to observe the operation of a part or to perform an operation on a part that is located at some extremity of the vehicle while a vehicle foot pedal is simultaneously actuated. For example, in brake repair or maintenance, it is sometimes necessary to operate the brake shoe or pad to check for proper movement or binding. Also, the new anti-lock brake modules and valves require reading resistances under the vehicle while the brake pedal is depressed. Testing brake light wiring requires that the brake light be observed or a current in the brake wire tested while the brake pedal is depressed. Furthermore, hydraulic brake lines are often bled of air by repetitively pumping the brake pedal with the line bleeder valve open until all air is removed. Beyond the braking system, clutch mechanism operation can only be checked while the clutch pedal is depressed and released.

In one common method of actuating a vehicle pedal during maintenance or repair operations, a second worker sits in the vehicle and operates the particular pedal at the directions of the technician or mechanic who observes or performs the particular repair function outside of the vehicle passenger compartment. This common approach, however, results in increased labor costs and may be time consuming, particularly when the vehicle is elevated on a rack and must be lowered in order for the pedal operator to enter the vehicle.

In addition to simply having an extra worker actuate the desired pedal, a number of pedal actuating devices have been devised. U.S. Pat. No. 1,907,835 to LANGBEIN is directed to one brake operating device. The LANGBEIN device includes an elongated pneumatic cylinder adapted to be positioned between the brake pedal and the vehicle driver's seat. The device is adapted to be extended by the application of a controlled fluid pressure to the pneumatic cylinder but relies on the return spring of the brake pedal to return the pedal to its normal position.

U.S. Pat. No. 3,464,263 to OMANDAN is directed to another testing device for mechanical brakes. Similar to the LANGBEIN device, the testing device disclosed by OMANDAN uses fluid (air) pressure to extend a piston member so as to depress a brake pedal, but again relies on the brake pedal return spring for returning the brake pedal to its normal position. OMANDAN also discloses a valve selector unit for remotely controlling the application of air pressure to the pneumatic cylinder and piston device.

U.S. Pat. No. 3,662,593 to PIRRELLO ET AL. is directed to an apparatus for simultaneously actuating vehicle accelerator and brake pedals for test purposes. The disclosed device includes a pneumatic piston and cylinder arrangement for actuating the brake pedal, with a spring for biasing the cylinder away from the pedal. The PIRRELLO ET AL. device also includes an electric motor driven actuator for depressing the vehicle accelerator pedal. However, the disclosed device requires a separate test stand that must be mounted in the vehicle, making the device difficult to install and ill-suited for maintenance and repair applications.

SUMMARY OF THE INVENTION

It is a general object of the invention to provide a vehicle pedal actuator device adapted to overcome the problems associated with prior vehicle pedal actuators, and particularly to provide an actuator that may be used for maintenance and repairs with a wide variety of vehicles, that provides both actuating and return movement, and that may be controlled remotely by a technician working at various locations about the vehicle.

Pursuant to these objectives, a vehicle foot pedal actuator device is adapted to provide power not only for depressing the particular pedal to be actuated, but also power for returning the pedal quickly to its normal position. The actuator device includes an elongated and variable length extension means or assembly adapted to be positioned between the vehicle driver's seat and the pedal to be actuated for extending to depress the pedal and for retracting to pull the pedal back to its normal position. Drive means are connected to the extension means for selectively extending and retracting the extension means, and control means are provided for controlling the operation of the device from various positions outside the vehicle passenger compartment.

In the preferred form of the invention, the extension means includes an elongated extension housing and an elongated extension member received in the housing and adapted to slide therethrough in a telescoping fashion. A drive means is mounted on the housing and adapted to drivingly engage the extension member for extending and retracting the extension member to vary the overall length of the assembly. The extension means also includes connecting means for connecting the elongated extension housing and extension member between the foot pedal to be actuated and the vehicle driver's seat so that the particular pedal may be quickly depressed and returned to its normal position repeatedly.

The preferred connector according to the invention includes a pedal connector connected to an extending end of the extension member for removably connecting that end of the extension member to the pedal to be actuated so that the extension member may impart both a pushing and pulling force on the pedal. A seat connecting device is connected to a seat end of the extension housing and is adapted for quickly and removably connecting the seat end of the housing to the vehicle driver's seat.

The preferred seat connector includes an elongated seat front member adjustably connected to the seat end of the extension housing and adapted to lay flat against the front edge of the vehicle driver's seat when the extension assembly is positioned to extend between the seat and the pedal to be actuated. The seat connector also includes a seat belt connecting member connected to the seat front member and adapted to receive a portion of the vehicle driver's seat belt. The belt may be tightened through the seat belt connecting member so as to hold the seat front member securely against the front edge of the seat. Thus, the preferred seat connector device may be positioned at any desired point along the front edge of the seat so as to properly reach any of the vehicle foot pedals.

The drive means according to the invention includes a bidirectional DC electric drive motor connected to the extension housing through a drive gear assembly. The drive gear assembly preferably includes a pinion drive gear connected by suitable gearing to be driven by the drive motor, and the extension member preferably includes rack teeth along a portion of its length adapted to mesh with the pinion gear for driveably coupling the drive motor to the extension member. Thus, the drive means or assembly provides positive coupling between the drive motor and the extension member for extending the extension member to depress a pedal and for retracting the extension member to return the pedal to its normal position.

The foot pedal actuator device according to the invention also includes a unique control system for controlling the operation of the drive motor, and thus, the extension and retraction of the extension member. The preferred control system includes a relay unit preferably mounted on the extension housing and a remote control unit connected to the relay unit with a suitable electrical extension cable. The relay unit includes relays for supplying electric power to the electric drive motor either in an extending polarity or a reversed retracting polarity. Also, the preferred relay system is adapted to prevent the drive motor from simultaneously receiving power in both extending and retracting polarity.

The relay means or system preferably includes a retracting relay mounted in the relay unit for providing retracting polarity power from a DC power supply to the drive motor in response to a control signal received from the remote control unit. An extending relay is adapted for providing extending polarity power from the DC power source to the drive motor in response to a control signal provided through the retracting relay only when the retracting relay is not receiving the retract control signal. The double relay system thus prevents the electric motor from simultaneously receiving both extending and retracting power which could damage the drive motor. The relay unit also preferably includes a retract shut-off switch adapted to be actuated when the extension member is fully retracted to break the circuit of the retract control signal, and thereby stop the drive motor when the extension member is fully retracted.

The control signals are preferably provided through suitable control switches mounted on the remote control unit. In the preferred form of the invention, the remote control unit includes a retract switch and a separate extend switch. The remote control unit may also include a permanent magnet or other suitable fastening means for releasably fastening the remote control unit to the vehicle under maintenance or repair. The electrical connecting extension cable is preferably a self coiling cable long enough to extend from the vehicle passenger compartment to any extremity of the vehicle where maintenance or repair work may be performed. The connecting extension cable may also be adapted for readily disconnecting from the relay unit or the remote control unit or both, for storage or packaging.

In the preferred form of the invention, the electrical power for driving the drive motor is supplied through the vehicle battery. Electrical power from the battery may be conveniently supplied through the vehicle cigarette lighter socket, the control system having a power connecting cord with a suitable adapter for electrically connecting the cord to conduct electrical power from the cigarette lighter socket to the relay unit. Where the operating power is supplied through the vehicle battery, the vehicle pedal actuating device requires no external power of any type. Alternatively, a foot pedal actuator device according to the invention may be adapted to operate on regular house current supplied through a suitable extension cord and a rectifier circuit.

The preferred form of the invention also includes indicator means for providing an indication of the operational status of the vehicle foot pedal actuator device at the remote control unit. Thus, the indicator means enables better control of the foot pedal actuator device from the remote location where maintenance or repairs are being conducted. The preferred indicator means includes an LED display on the remote control unit connected through the two control switches so as to light one color when the extension member is being extended, and another color when the member is being retracted. The LED display is also adapted to remain unlit when the extension member is stationary with respect to the extension housing. Furthermore, the retract indicator light is adapted to go out automatically when the extension member is fully retracted, and thus provides an indication of the actual position of the extension member when the member is fully retracted.

According to the method of the invention, the extension assembly, including the elongated extension housing and fully retracted elongated extension member, is first connected so as to extend between the vehicle driver's seat front and the pedal to be actuated, the pedal being in its normal unactuated position. With the extension assembly in the connected position, the assembly is operated to extend the extension member out of the housing, varying the overall length of the extension assembly and depressing the vehicle foot pedal to which it is connected. The extension member may then be retracted back into the housing, decreasing the length of the extension assembly and pulling the foot pedal back to its normal at-rest position. Both the steps of extending and retracting are performed under power supplied through the extension assembly drive motor.

The step of connecting the extension assembly preferably includes positioning the second or seat end of the elongated extension assembly to bear against the front edge of the vehicle driver's seat and then maintaining the seat end of the extension assembly in this position with the vehicle driver's seat belt. The preferred connecting step also includes positioning the first or extending end of the elongated extension assembly to bear against the front of the particular pedal to be actuated and then maintaining the first end of the elongated extension assembly in this position with the pedal connector member. The pedal connector extends over the pedal edge and includes a portion adapted to bear against the back of the pedal so that the extension assembly may impart both a pulling and pushing force to the pedal.

The steps of extending and retracting the extension member also preferably include providing electrical power for the drive motor from the vehicle battery through the vehicle cigarette lighter socket. Also, the step of extending the extension member includes providing an extension signal from the remote control unit and the step of retracting the extension member includes providing a retracting signal from the remote control unit. Thus, the steps of extending and retracting the extension member to actuate the particular vehicle foot pedal are controlled from a remote location conveniently by the maintenance or repair technician.

The preferred method of the invention also includes the step of indicating at the remote control unit whether the extension member is extending, retracting, or stationary relative to the extension member housing. This indicating step preferably includes lighting a first color LED as the extension member is extending, lighting a second color LED as the extension member is retracting, and blocking electrical current through both the first and second color LEDs when the electric motor is not operating and the vehicle extension member is stationary with respect to the extension housing. Also, the indicating step preferably includes automatically turning off the retract indicator LED when the extension member is fully retracted.

These and other objects, advantages, and features of the invention will be apparent from the following description of the preferred embodiments, considered along with the accompanying drawings.

BRIEF DESCRIPTION OF THE DRAWINGS

FIG. 4 is a somewhat schematic isometric view of the preferred drive gear assembly.

FIG. 5 is a view in transverse cross section taken along line 5—5 of FIG. 3.

FIG. 6 is view in transverse cross section taken along line 6—6 of FIG. 3.

DESCRIPTION OF THE PREFERRED EMBODIMENT

Figure 1:
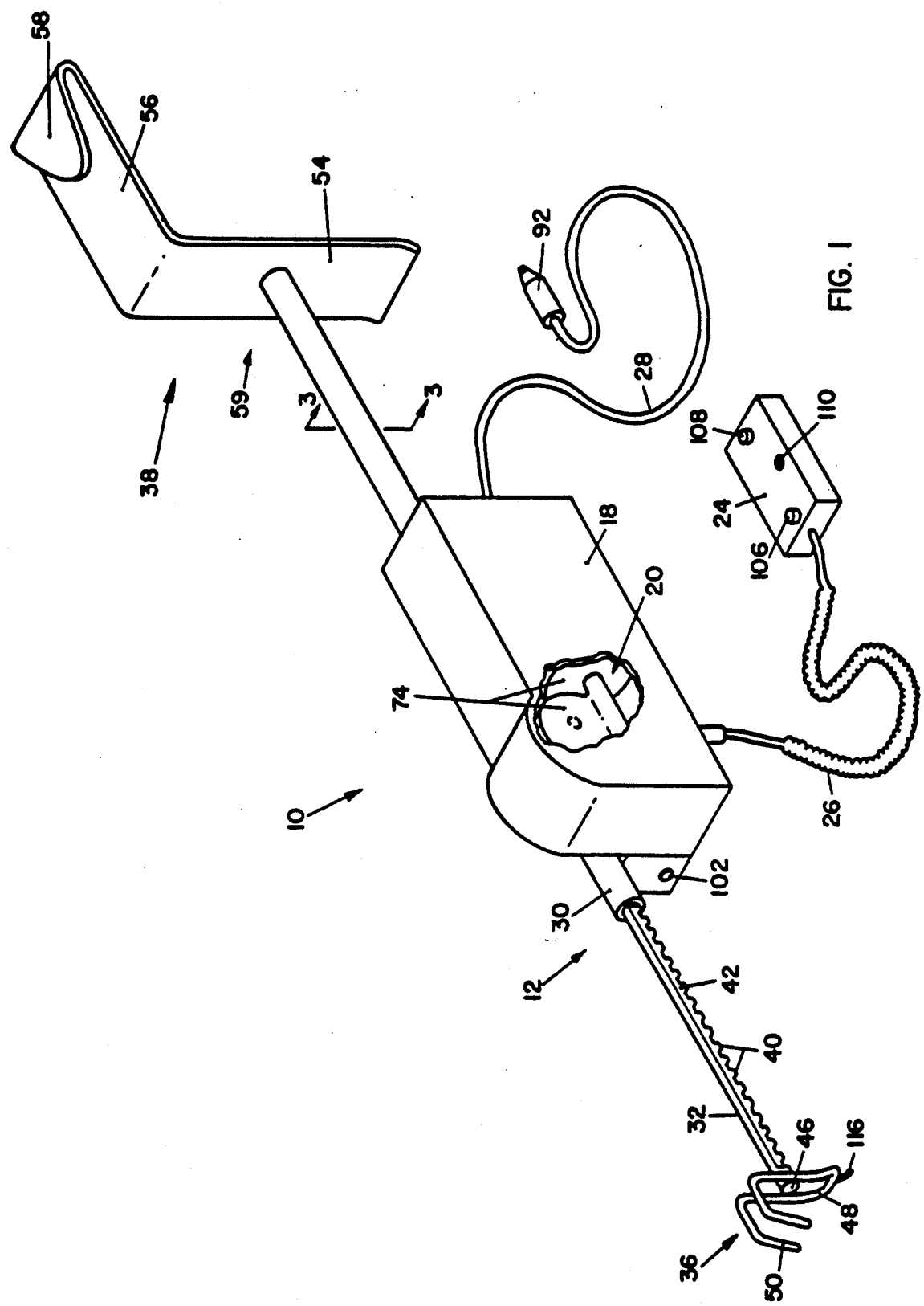
FIG. 1 is a partially cut away isometric view of a foot pedal actuator device embodying the principles of the invention.
Figure 2:
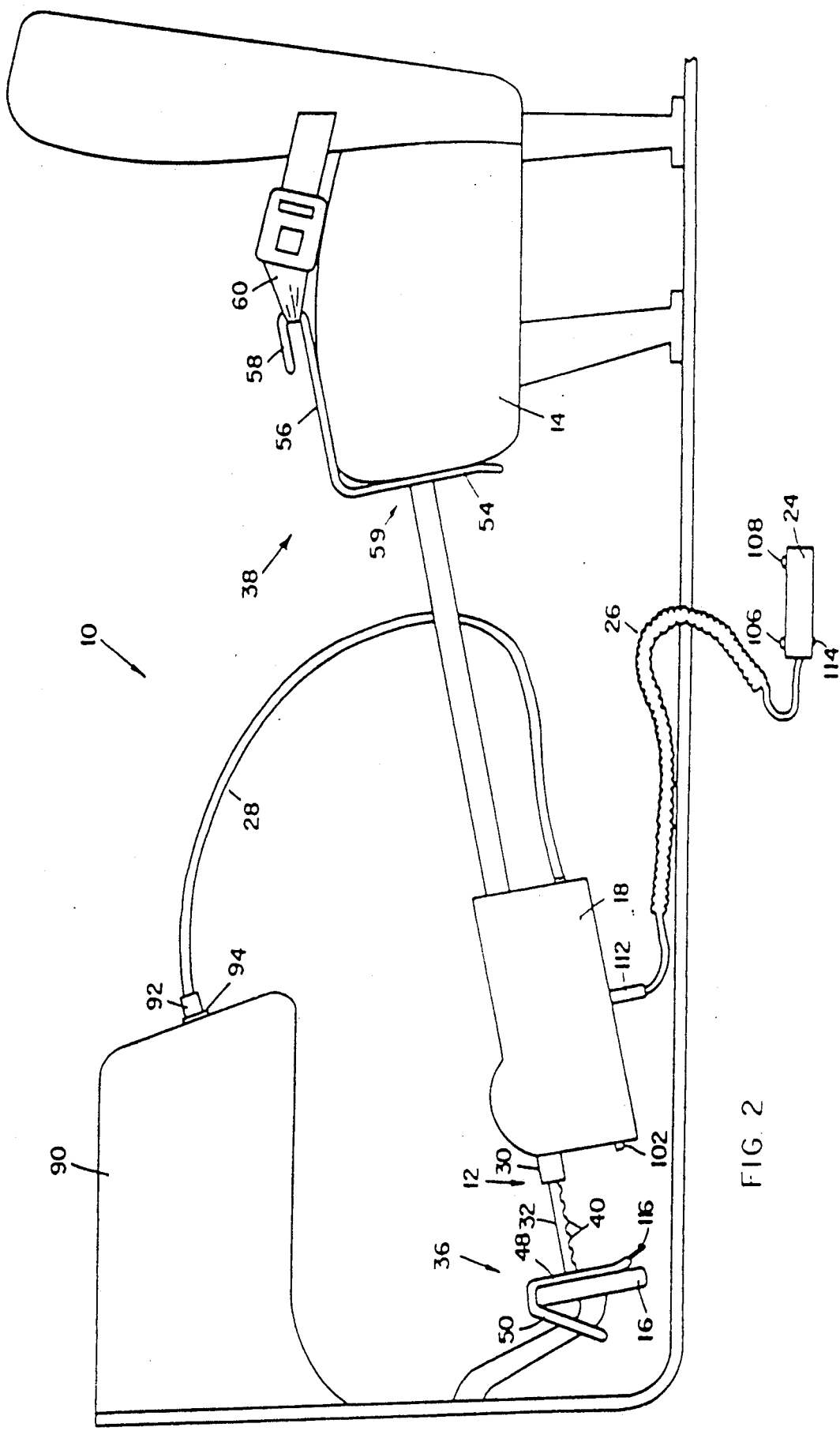
FIG. 2 is a left side elevation of the foot pedal actuator device shown in FIG. 1 connected in position for actuating a vehicle foot pedal.
Figure 3:
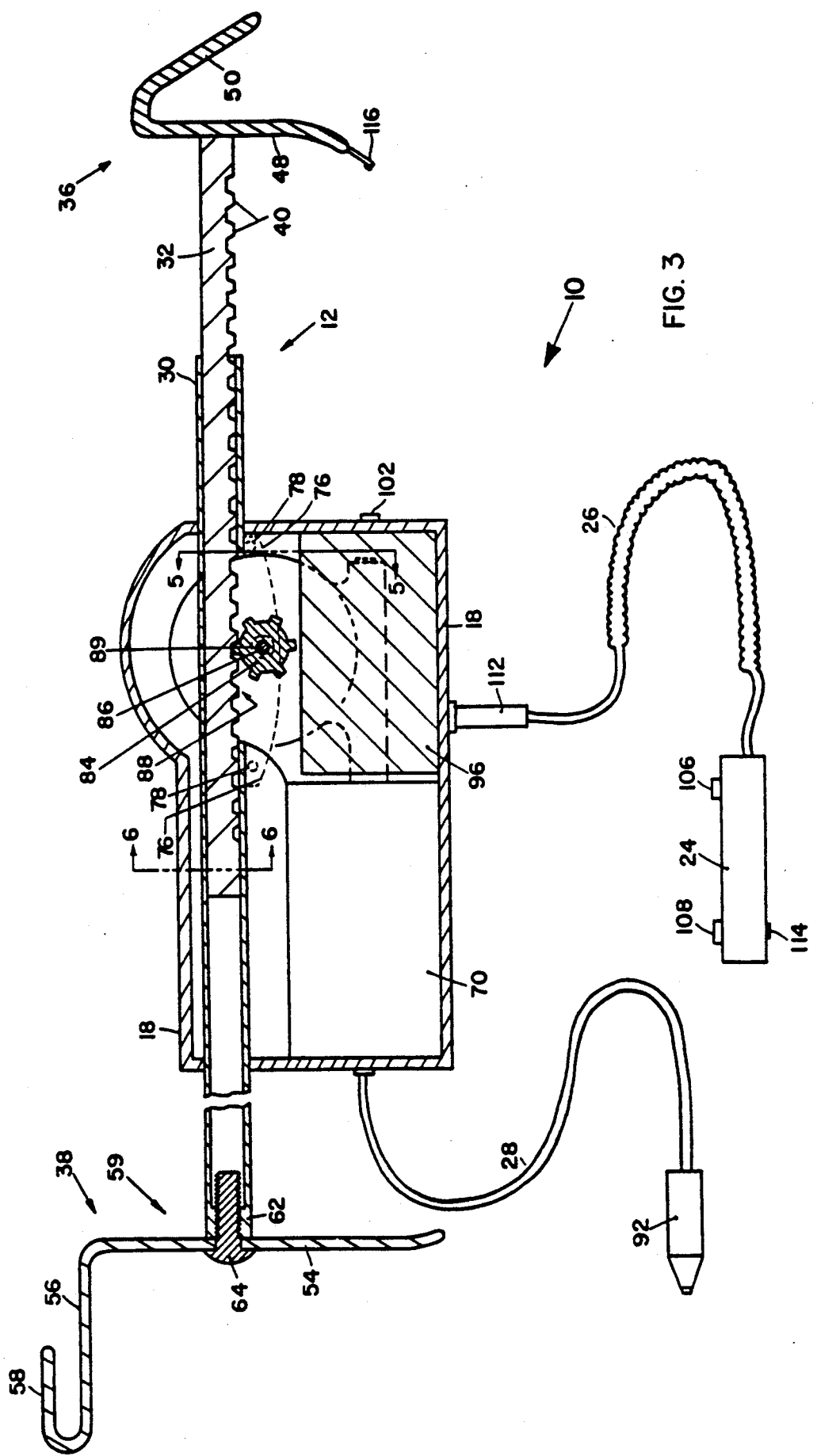
FIG. 3 is a view in longitudinal cross section taken along line 3—3 of FIG. 1.

A vehicle foot pedal actuator 10 embodying the principles of the invention is illustrated by way of example in FIGS. 1, 2, and 3. The foot pedal actuator 10 includes extension means generally indicated at reference number 12 adapted for connecting between the vehicle driver's seat 14 and the pedal to be actuated 16, as shown in FIG. 2. The actuator device 10 also includes a main housing 18 adapted to house an extension drive means generally indicated at reference number 20, and a portion of a control means 22 illustrated schematically in FIG. 7. The control means 22 also includes a moveable remote control unit 24 connected by extension cable 26. A power cable 28 is connected to supply electrical power to operate the pedal actuator device 10.

The extension means 12 includes an extension housing 30 and an extension member 32 adapted to be received in the extension housing. The extension means 12 also includes connecting means comprising a pedal connector 36 and a seat connector 38. The two connectors 36 and 38 are adapted to removably connect the foot pedal actuator device 10 between the foot pedal to be actuated 16 and the vehicle driver's seat 14 so as to enable the actuator device to both depress the pedal and to pull the pedal back to its normal position after being depressed.

The extension housing 30 in the illustrated preferred form of the invention comprises a cylindrical tube of a suitable rigid material, preferably a suitable metal. The extension member 32 preferably comprises a rod made of a suitable rigid material adapted to fit snugly but slidably within the housing tube 30 so that it can extend from and retract into the housing tube in a telescoping fashion. A series of rack teeth 40 are formed along at least a portion of the extension member rod 32 and are adapted to cooperate and mesh with the driving means 20 so that the driving means can extend and retract the extension member. As best shown in the transverse cross section views in FIGS. 5 and 6, the extension member rod 32 in the preferred form of the invention includes a flat surface 42 along one side which is adapted to cooperate with a suitable orienting drive surface extending within the housing tube 30 to maintain the extension member rod in the correct orientation within the housing. In this form of the invention, the orienting surface comprises a surface 43 of the drive means 20.

The pedal connector 36 in the illustrated form of the invention is connected to an extending end 46 of the extension member rod 32 and includes a push section 48 and a pull section 50. As shown best in FIG. 2, the push section 48 is adapted to be connected so as to abut the front surface of the pedal 16 to enable the extension member to impart a pushing or depressing force upon the pedal. The pull section 50 of the pedal connector 36 is adapted to loop or hook over the pedal, preferably on either side of the pedal lever arm, and to enable the extension member to impart a pulling force on the pedal to return the pedal to its normal position. In the illustrated preferred form of the invention, the pedal connector 36 comprises a rod of suitable material bent or otherwise formed into a bent "U" shape to form the push and pull sections, 48 and 50 respectively.

The seat connector 38 according to the invention includes a seat front member 54 and a seat belt connecting member 56 having a seat belt receiving portion 58. The preferred seat front member 54 is adjustably connected to a seat end 59 of the extension housing tube 30 and extends generally perpendicularly to the extension tube in position to reside adjacent to the seat front when connected as shown in FIG. 2. The seat belt connector member 56 is rigidly connected to the seat front member 54 and adapted to extend over the top of the seat 14 with the seat belt receiving portion 58 positioned to snugly receive a driver's seat belt 60. The seat belt 60 can then be adjusted, as shown in FIG. 2, to draw and retain the seat connector 38 snugly against the seat 14. It will readily be appreciated that with the seat connector 38 connected as shown in FIG. 2, the telescoping extension member 32 and extension housing 30 assembly may impart both a pushing and pulling force to the pedal to be actuated 16. Thus, the pedal 16 can be depressed as the extension member 32 is driven out of the housing 30, and can also be returned to its normal position as the extension member is retracted back into the housing.

The seat connector 38 is also preferably adjustably connected by the seat front member 54 to the seat end 59 of the extension housing tube 30. The preferred adjustable connection allows the seat connector 38 to be extended from the housing tube 30 so as to adjust the overall length of the extension housing and extension member assembly between the pedal and seat connectors. Although the vehicle seat position may generally be adjusted to accommodate the actuator device 10, and seat adjustment is preferred, the adjustment capability at the seat end 59 of the housing tube 30 allows the foot pedal actuator device 10 to be adjusted for use with a wide range of vehicles and particularly vehicles which have no seat adjustment. As shown in FIG. 3, the preferred adjustable connection includes a female threaded portion 62 formed on the seat end 59 of the extension housing tube 30 and a carriage bolt or other threaded member 64 rigidly connected to the seat front member 54. The carriage bolt may be threaded in or out of the female threaded portion 62 to make the desired length adjustment.

The drive means 20 in the illustrated preferred form of the invention includes a bi-directional DC electric motor 70 and suitable drive gear means generally indicated at reference numeral 72, all preferably contained as a single unit within a drive unit housing 74 mounted within the main housing 18. The drive unit housing 74 is preferably connected directly to the extension housing tube 30 with a flange 76 by bolts 78 shown in FIG. 3.

The preferred drive gear means 72 are best illustrated in FIG. 4 and include a worm gear output shaft 80 adapted to be driven by the motor 70 and a relatively large worm wheel 82 mounted within the drive unit housing 74 to be driven by the worm on the output shaft. A pinion gear 84 is rigidly connected to the worm wheel 82 by a suitable pinion shaft 86 adapted to rotate with the worm wheel as it is driven by the worm gear output shaft 80. The pinion gear 84 is adapted to extend into the extension housing tube 30 through a gear opening shown generally at reference numeral 88 in FIG. 3 and is positioned to mesh with the rack teeth 40 formed on the extension member 32 for driving the extension member in a telescoping fashion into and out of the extension housing 30. One end of the pinion shaft 86 is also supported for rotation by a suitable opening 89 in the flange 76 as shown in FIG. 3. This support is required to keep the pinion gear 84 properly meshed with the rack teeth 40 on the extension member 32 when power is supplied to the pinion gear.

Although the gearing means 72 illustrated in FIG. 4 is preferred, those skilled in the art will readily appreciate that many alternate gearing arrangements may be used to drive the extension member 32 within the extension housing tube 30 as desired according to the invention. Any suitable gearing arrangement adapted for driving the extension member 32 into and out of the extension housing 30 may be used according to the invention.

The control means 22 is adapted to supply electrical power to the drive motor 70 to extend the extension member 32 to depress the pedal 16, and to retract the extension member to return the pedal back to its normal position. The preferred control means 22 includes relay means to provide such power and is preferably adapted to receive DC current from the vehicle battery. In the preferred form of the invention, a suitable adapter connector 92 with fuse 93 is adapted to connect with the vehicle cigarette lighter socket 94 in the vehicle dashboard 90 to provide electrical power from the vehicle battery (not shown) to operate the pedal actuator device 10. Although the cigarette lighter socket connection is preferred, other forms of the invention may include other means of providing electrical power for operating the actuator device. For example, the device 10 may be adapted to operate on regular household alternating current through a suitable AC to DC rectifying circuit.

The preferred relay means are contained within a relay unit 96 mounted within the main housing 18 as shown in FIG. 3. The remote control unit 24 is connected to the remainder of the control means 22 by the extension cable 26. The extension cable 26 is preferably a coiled cable adapted to easily extend so that the remote control unit 24 may be positioned at any point about the vehicle, and particularly at the front or rear wheel wells (not shown). Also, as shown in FIGS. 2, 3, and 7, the remote control unit preferably includes a suitable connector such as a permanent magnet 114 by which the unit may be releasably secured to a suitable metal part, a vehicle body panel for example.

Figure 7:
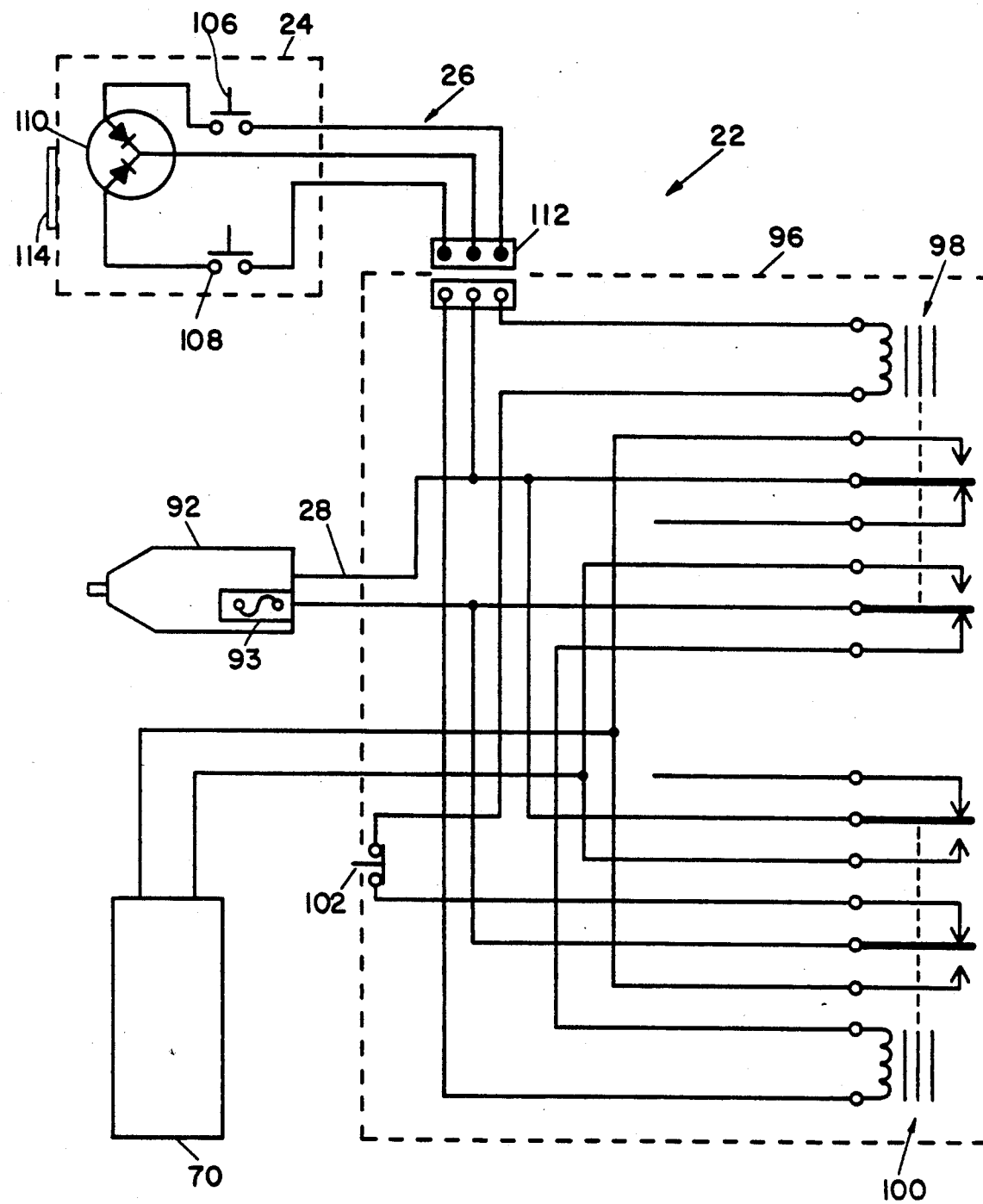
FIG. 7 is a schematic diagram showing the preferred control system according to the invention.

With particular reference to the schematic drawing FIG. 7, the preferred relay unit 96 includes a retract relay 98, an extend relay 100, and a retract shut-off switch 102. The remote control unit 24 preferably includes a normally open retract push button switch 106, a normally open extend push button switch 108, and an indicator means 110, in this form of the invention, a dual colored LED. In the preferred form of the invention, the remote control extension cable 26 is adapted to be connected to relay unit 96 by a suitable three terminal connector 112 so that the remote control unit 24 and cable can be quickly and easily disconnected from the remainder of the device 10 for storage or shipping.

In operation, the control means 22 is adapted to receive DC power through the power cord 28, preferably from the vehicle battery (not shown) through the cigarette lighter socket in the dashboard 90 with the adapter connector 92. To extend the extension member 32, the extension switch 108 in the remote unit 24 is closed to energize the coil of the extend relay 100. According to the preferred form of the invention, the extend relay coil receives current through the retract relay 98 in the normal non-energized position shown in FIG. 7. Thus, the extend relay 100 can only be energized with the retract relay 98 in its non-energized position. Energizing the coil of the extend relay 100 moves the double contacts to an energized position opposite that shown in the figure to provide electrical power in an extending polarity to the drive motor 70. Also, with the extend switch 108 closed, current flows through one of the LEDs of the indicator means 110, illuminating the particular LED and thus, indicating at the remote unit that the extension member 32 is being extended to depress the pedal 16 (FIG. 2).

Closing the retract switch 106 on the remote unit 24 with the extend switch 108 open energizes the coil of the retract relay 98. The circuit to the coil of the retract relay 98 runs through the normally closed retract shut-off switch 102 and through the extend relay 100 in the normal unenergized position. This circuit through the extend relay 100 prevents the retract relay from being energized when the extend relay is energized. Energizing the retract relay coil throws the contacts of the retract relay 98 to the energized position opposite that shown in FIG. 7 so as to complete a circuit to provide power in a retracting polarity to the DC motor 70. A second color LED of the dual LED indicating means 110 lights in response to closing the retract switch 106 to indicate at the remote unit 24 that the extension member 32 is being retracted back into the extension housing tube 30, returning the pedal 16 in FIG. 2 to its normal position. Once the extension member 32 is fully retracted, a bump member 116 connected to the pedal connector 36 is adapted to contact and depress the normally closed retract shut-off switch 102 and thereby break the circuit to the coil of the retract relay 98, returning the retract relay contacts to their normal position shown in FIG. 7 and stopping the motor 70.

It should be noted that although the preferred input power through the connector 92 and power cord 28 is at 12 volts, only low voltage (approximately 2 volts) and low current flow through the remote extension cable 26 and the elements of the remote control unit 24 when either switch 106 or 108 is closed. The low voltage required through the cable 26 and remote control unit 24 enhances the safety of the device.

According to the method of the invention and referring particularly to FIG. 2, the extension means or assembly 12 is first connected between the pedal to be actuated 16 and the vehicle driver's seat 14. The method continues with the step of extending the extension member with the electric motor 70 (FIGS. 3 and 4). As the member 32 extends from the extension housing tube 30, the extension member pushes against the pedal 16 so as to depress or actuate the pedal. The method according to the invention then includes retracting the extension member 32 back into the extension housing tube 30 with the drive motor 70, returning or pulling the pedal 16 back to its normal position.

The step of connecting the extension means or assembly 12 preferably includes first positioning the seat or first end 59 of the extension assembly or means 12 to bear against the driver's seat 14, and then maintaining the seat or first end in position by strapping the vehicle driver's seat belt 60 through the seat belt receiving portion 58 of the seat connector 38. The step of connecting the extension assembly 12 also preferably includes positioning the extending or second end 46 of the extension assembly to bear against the front of the pedal to be actuated 16. The method further includes maintaining the extending or second end 46 of the extension assembly 12 in its position against the front of the pedal 16 with the pedal connector 36 that includes a pull section 50 extending over the pedal and is adapted to bear against the back surface of the pedal. These connection steps are performed in the preferred form of the invention with the extension member 32 in its fully retracted position and with the pedal to be actuated in its normal unactuated position. Thus the step of connecting the extension assembly 12 may also include either adjusting the seat position to accommodate the extension assembly or adjusting the length of the assembly by the adjustment means at the seat end 59 of the housing tube 30.

In the preferred form of the invention, the steps of extending and retracting the extension member to work the pedal 16 include providing electrical power from the vehicle through the vehicle cigarette lighter socket. Also, the step of extending the extension member 32 includes providing an extension signal from the remote control unit 24 which may be easily positioned at some extremity of the vehicle, and the step of retracting the extension member includes providing a retracting signal from the remote control unit. The generation of the preferred extension and retraction signals is discussed above with regard to the operation of the control circuit shown in FIG. 7.

The preferred method of the invention also includes the step of indicating at the remote control unit 24, the operational status of the device 10, that is, whether the extension member is being extended, retracted, or is stationary. In the illustrated and preferred form of the invention, the step of indicating the operational status of the device 10 includes lighting a first color LED on the remote control unit 24 when the extension member 32 is being extended, lighting a second color LED on the remote control unit when the extension member is being retracted, and maintaining both LEDs in an unenergized unlighted state when the extension member is stationary with respect to the extension housing 30. Furthermore, the method of the invention includes automatically shutting off the second (retract) color LED on the remote control unit when the extension member is fully retracted to indicate actual position, that is, full retraction, of the extension member 32.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. A vehicle foot pedal actuator device for actuating the foot pedals of an automobile or the like, the actuator device comprising:
    A. extension means, adapted to be connected between the vehicle driver's seat and the pedal to be actuated, for extending to depress the pedal and for retracting to pull the pedal back to its normal position;
    B. drive means connected to the extension means for selectively extending the extension means with an extending force to depress the pedal to be actuated and retracting the extension means with a retracting force, the drive means being capable of applying the retracting force in substantially the same magnitude as the extending force; and
    C. moveable control means for controlling the operation of the drive means from various positions outside of the vehicle passenger compartment.

2. The vehicle foot pedal actuator device of claim 1 wherein the extension means includes:
    A. an elongated extension housing;
    B. an elongated extension member slidably received in the elongated extension housing and drivingly engaged with the drive means; and
    C. connecting means for connecting the elongated extension housing and extension member between the foot pedal to be actuated and the vehicle driver's seat so that as the extension member is driven to extend further out of the elongated extension housing, the extension member pushes against and depresses the pedal to be actuated, and so that as the extension member is driven to retract back into the extension housing, the extension member pulls the pedal back toward its normal position.

3. The vehicle foot pedal actuator device of claim 2 wherein the connecting means includes:
    A. pedal connector means connected to an extending end of the extension member for removably connecting the extending end of the extension member to the pedal to be actuated so that the extension member may impart both a pushing and pulling force on the pedal;
    B. a seat front member connected to a seat end of the elongated extension housing and adapted to reside adjacent to the front of the vehicle seat when the extension means is connected between the vehicle driver's seat and the pedal to be actuated; and
    C. a seat belt connecting member connected to the seat front member and adapted to receive a portion of the vehicle driver's seat belt so as to hold the seat front member securely against the seat front edge.

4. The vehicle foot pedal actuator device of claim 2 wherein the drive means includes:

A. a bi-directional electric drive motor connected to the extension housing; and
B. rack teeth positioned along at least a portion of the extension member;
C. a drive pinion gear adapted to drivingly mesh with the rack teeth on the extension member;
D. a worm gear connected to be driven by the drive motor; and
E. a worm wheel drivingly engaged with the worm gear and the drive pinion gear so that as the worm gear is driven by the drive motor, the worm wheel rotates the drive pinion gear to drive the extension member.

5. The vehicle foot pedal actuator device of claim 4 wherein the control means includes relay means for supplying electric power to the electric motor in either an extending polarity or a reversed retracting polarity.

6. The vehicle foot pedal actuator device of claim 5 wherein the relay means is adapted to prevent the electric motor from simultaneously receiving both extending and retracting power.

7. The vehicle foot pedal actuator device of claim 4 wherein the control means includes:
A. a remote control unit having controls for extending and retracting the extension member, and being connected to the drive motor through a suitable remote control electrical connecting cable.

8. The vehicle foot pedal actuating device of claim 7 wherein the control means further includes:
A. an extend switch mounted on the remote control unit;
B. a retract switch mounted on the remote control unit;
C. retract relay means for providing retracting polarity power from an electrical power supply to the drive motor in response to a control signal received through closing the retract switch.

9. The vehicle foot pedal actuating device of claim 8 wherein the control means includes:
A. retract shutoff switch means for breaking the electrical circuit of the retract control signal when the extension member is fully retracted.

10. The vehicle foot pedal actuating device of claim 9 wherein the control means further includes:
A. extend relay means for providing extending polarity power from the electrical power source to the drive motor in response to a control signal provided through the retract relay only when the retract relay is not receiving a control signal through the retract switch.

11. The vehicle foot pedal actuating device of claim 4 wherein the control means is adapted to provide electrical power for the electrical drive motor from the vehicle battery through the vehicle cigarette lighter socket.

12. The vehicle foot pedal actuator device of claim 1 wherein the control means includes indicator means for indicating the operational status of the drive means.

13. The vehicle foot pedal actuator device of claim 12 wherein the indicator means is mounted on a remote control unit and includes an LED display adapted to light one color as the drive motor operates to extend the extension member, to light a different color as the drive motor operates to retract the extension member, and to not light when the drive motor is not operating.

14. A vehicle foot pedal actuator device for actuating a foot pedal of an automobile or the like, the actuator device comprising:
A. an elongated extension housing;
B. an elongated extension member slidably received in the elongated extension housing;
C. pedal connector means connected to an extending end of the extension member for removably connecting the extending end of the extension member to a pedal to be actuated so that the extension member may impart both a pushing and pulling force on the pedal;
D. a seat front member connected to a seat end of the elongated extension housing;
E. a seat belt connecting member connected to the seat front member and adapted to receive a portion of the vehicle driver's seat belt so as to hold the seat front member securely against the front of the vehicle driver's seat;
F. drive means connected to the extension housing for selectively extending and retracting the extension member; and
G. moveable control means for controlling the operation of the drive means from various positions outside of the vehicle passenger compartment when the extension member and extension housing are connected between the pedal to be actuated and the vehicle driver's seat.

15. The vehicle foot pedal actuator device of claim 14 wherein the drive means comprises:
A. a bi-directional drive motor connected to the extension housing;
B. rack teeth positioned along at least a portion of the extension member;
C. a drive pinion gear adapted to drivingly mesh with the rack teeth on the extension member;
D. a worm gear connected to be driven by the drive motor; and
E. a worm drivingly engaged with the worm gear and the drive pinion gear so that as the worm gear is driven by the drive motor, the worm wheel rotates the drive pinion gear to drive the extension member.

16. A method of remotely operating a vehicle foot pedal comprising the steps of:
A. connecting an elongated extension assembly between the pedal to be actuated and the vehicle driver's seat, the extension assembly including an extension member slidably connected to an extension housing in position to extend and retract from the housing to vary the length of the extension assembly;
B. extending the extension member from the extension housing with an extending force provided by an electric motor drivingly engaged with the extension member, the extension member depressing the pedal as it extends; and
C. retracting the extension member back into the housing with a retracting force provided by the electric motor and having a magnitude substantially equal to the extending force, the extension assembly pulling the pedal back to its normal position as the extension member retracts.

17. The method of claim 16 wherein the steps of extending and retracting the extension member include providing electrical power for the electric motor from the vehicle battery through the vehicle cigarette lighter socket.

18. The method of claim 16 wherein:
A. the step of extending the extension member includes providing an extension signal from a remote control unit; and B. the step of retracting the extension member includes providing a retracting signal from the remote control unit.

19. The method of claim 18 including the step of indicating at the remote control unit whether the extension member is extending, retracting, or not moving relative to the extension member housing.

20. The method of claim 19 wherein the step of indicating includes:
   A. lighting a first color LED as the extension member is extending;
   B. lighting a second color LED as the extension member is retracting; and
   C. blocking electrical current to both the first and second color LED when the electric motor is not operating.

21. The method of claim 16 wherein the step of connecting the extension assembly between the pedal to be actuated and the vehicle driver's seat includes:
   A. positioning a first end of the elongated extension assembly to bear against the front edge of the vehicle driver's seat;
   B. maintaining the first end of the elongated extension assembly in its position abutting the front edge of the vehicle driver's seat with the vehicle driver's side seat belt;
   C. positioning a second end of the elongated extension assembly to bear against the front of the pedal to be actuated; and
   D. maintaining the second end of the elongated extension assembly in its position abutting the front of the pedal to be actuated with a pedal connector member that extends over the pedal and includes a portion adapted to bear against the back of the pedal so that extension assembly may impart both a pulling and pushing force to the pedal.

22. The method of claim 16 including the step of:
   A. holding the extension member in a particular position with respect to the extension housing with a worm gear drivingly engaged with the drive motor and drivingly engaged with the extension member through a worm wheel and pinion gear arrangement.

* * * * *

UNITED STATES PATENT AND TRADEMARK OFFICE
CERTIFICATE OF CORRECTION

PATENT NO. : 5,012,689

DATED : May 7, 1991

INVENTOR(S) : Steven R. Smith

It is certified that error appears in the above-identified patent and that said Letters Patent is hereby corrected as shown below:

In claim 15, column 12, line 35, before "drivingly" insert --wheel--.

Signed and Sealed this

Fifteenth Day of September, 1992

Attest:

DOUGLAS B. COMER

*Attesting Officer*   Acting Commissioner of Patents and Trademarks